(12) United States Patent
Theis

(10) Patent No.: US 7,488,115 B2
(45) Date of Patent: Feb. 10, 2009

(54) FIBER-OPTICAL PLUG AS WELL AS A SINGLE AND DOUBLE COUPLER FOR RECEIVING SUCH A PLUG

(75) Inventor: Michael Theis, Mittenaar (DE)

(73) Assignee: Euromicron Werkzeuge GmbH, Mittenaar (DE)

( * ) Notice: Subject to any disclaimer, the term of this patent is extended or adjusted under 35 U.S.C. 154(b) by 41 days.

(21) Appl. No.: 11/597,965

(22) PCT Filed: Oct. 14, 2004

(86) PCT No.: PCT/DE2004/002278

§ 371 (c)(1),
(2), (4) Date: Nov. 29, 2006

(87) PCT Pub. No.: WO2005/045497

PCT Pub. Date: May 19, 2005

(65) Prior Publication Data

US 2008/0085082 A1    Apr. 10, 2008

(30) Foreign Application Priority Data

Oct. 28, 2003  (DE)  .............................. 203 16 625 U
Oct. 28, 2003  (DE)  .............................. 203 16 625 U

(51) Int. Cl.
*G02B 6/36*  (2006.01)
(52) U.S. Cl. ............................ 385/60; 385/55; 385/72
(58) Field of Classification Search ................. None
See application file for complete search history.

(56) References Cited

U.S. PATENT DOCUMENTS 4,487,474 A   12/1984  Nishie et al.

(Continued)

FOREIGN PATENT DOCUMENTS

DE    298 13 475 U1    12/1998

(Continued)

OTHER PUBLICATIONS

International Search Report PCT/DE2004/002278 mailed Jan. 2005.

(Continued)

*Primary Examiner*—Sung H Pak
*Assistant Examiner*—Mike Stahl
(74) *Attorney, Agent, or Firm*—Collard & Roe, P.C.

(57) ABSTRACT

The invention relates to a connector for creating an optical waveguide connector-in connection for an optical waveguide cable containing an optical waveguide, said connector comprising a housing, a ferrule holder arranged in the housing, and a locking device arranged outside the housing, on a narrow side thereof. The inventive connector has a housing that has the outer shape of an RJ-45 connector, is open on the front side and the rear side thereof, and has an inner region surrounded by the narrow sides extending parallel to the longitudinal axis of the connector-in connection, and a catch spring used as a locking device for engaging in a coupling, the catch spring being elastically connected to the housing. Ferrule holders for each of the optical waveguides guided into the inner region through the rear side of the housing are arranged in the inner region, each ferrule holder being respectively provided with a recess for a coupling ferrule on the side thereof facing the front side of the housing. The invention also relates to a double coupler and a single coupler, having a housing that is a modified housing of an RJ-45 connector and has a rear engagement in the locking device of the connector, and a coupling insert containing a ceramic sleeve and a coupling ferrule.

19 Claims, 3 Drawing Sheets

U.S. PATENT DOCUMENTS

Figure 1:
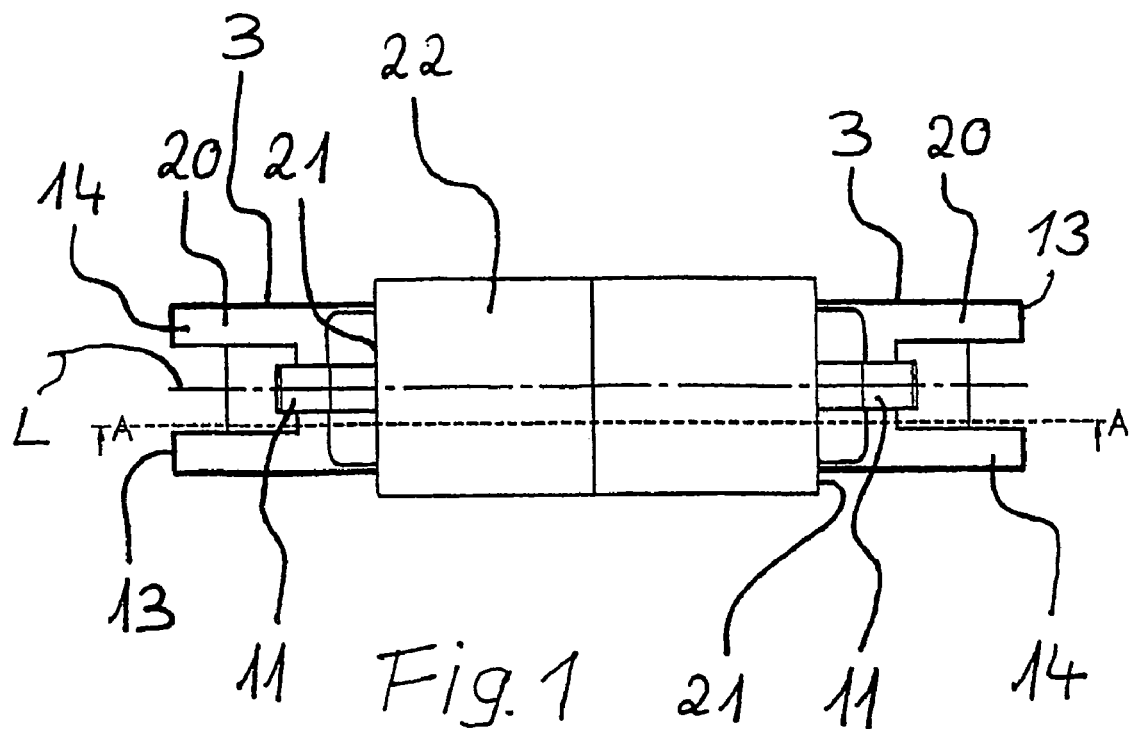

| | | |
|---|---|---|
| 4,725,117 A | 2/1988 | Ellis |
| 5,267,342 A | 11/1993 | Yamada et al. |
| 5,363,460 A | 11/1994 | Marazzi et al. |
| 5,381,498 A * | 1/1995 | Bylander .................. 385/83 |
| 5,721,799 A * | 2/1998 | Fentress .................... 385/77 |
| 5,737,464 A | 4/1998 | Underwood et al. |
| 5,764,834 A | 6/1998 | Hultermans |
| 5,896,480 A * | 4/1999 | Scharf et al. .............. 385/88 |
| 6,290,402 B1 | 9/2001 | Shishikura et al. |
| 6,402,393 B1 | 6/2002 | Grimes et al. |
| 6,517,253 B1 | 2/2003 | Graesser |
| 6,588,938 B1 | 7/2003 | Lampert et al. |
| 6,599,025 B1 * | 7/2003 | Deutsch .................... 385/75 |
| 7,025,507 B2 | 4/2006 | de Marchi |
| 2002/0081077 A1 | 6/2002 | Nault |
| 2004/0109646 A1 * | 6/2004 | Anderson et al. ........... 385/71 |
| 2006/0263011 A1 * | 11/2006 | Chen et al. ................. 385/75 |
| 2007/0105452 A1 * | 5/2007 | Gerlach et al. ............ 439/676 |

FOREIGN PATENT DOCUMENTS

| | | |
|---|---|---|
| DE | 199 30 062 A1 | 2/2000 |
| EP | 0 043 585 | 1/1982 |
| EP | 0 599 784 B1 | 6/1994 |
| EP | 1 130 433 A | 9/2001 |
| EP | 1 199 587 A | 4/2002 |
| EP | 1 335 222 | 8/2003 |
| JP | 54 158241 A | 12/1979 |
| WO | WO 00/37979 | 6/2000 |

OTHER PUBLICATIONS

English translation of International Preliminary Report on Patentability for PCT/DE2004/002278, dated Jul. 2006.

* cited by examiner

FIBER-OPTICAL PLUG AS WELL AS A SINGLE AND DOUBLE COUPLER FOR RECEIVING SUCH A PLUG

CROSS REFERENCE TO RELATED APPLICATIONS

Applicant claims priority under 35 U.S.C. §119 of German Application No. 203 16 625.5 filed Oct. 28, 2003 and German Application No. 203 17 751.7 filed Nov. 18, 2003. Applicant also claims priority under 35 U.S.C. §365 of PCT/DE2004/002278 filed Oct. 14, 2004. The international application under PCT article 21(2) was not published in English.

FIELD OF THE INVENTION

The invention relates to a plug for creating an optical waveguide plug-in connector for an optical waveguide cable having at least one optical waveguide, said plug comprising a housing, a ferrule holder connected to the optical waveguide and arranged in the housing, and at least one locking device arranged on the outside on a narrow side of the housing, according to the generic part of claim 1, and the invention also relates to a coupler to detachably receive such a plug on the front, according to claims 16 and 19.

DESCRIPTION OF RELATED ART

In order to detachably connect optical waveguides to each other, for example, at the rear of a device or in a passage through a housing or a wall, plugs and/or sockets that match the plugs and that are in the form of individual couplers—referred to as receptacles in the case of optical waveguides—are placed onto the ends of the optical waveguides that are to be connected and they are affixed to the optical waveguides, for example, by crimping, shrinking, gluing, encapsulating or welding, so that subsequently, when the plug is inserted into the socket, light can be reliably transmitted from one front end of one optical waveguide into the front end of the opposite optical waveguide.

An optical waveguide used in optical transmission technology normally has a cross section available for the optical transmission that usually has a diameter of less than 125 µm, whereby only part of the cross section can actually be used for the signal transmission. In order to reliably couple an optical signal from one optical waveguide into the other, it is necessary to have a certain overlapping of the two optical waveguides that are arranged in the double coupler with their front surfaces opposite from each other.

For this purpose, ferrules, preferably made of a ceramic material, are normally arranged in the plugs and sockets at the ends of the optical waveguides, said ferrules—depending on the type of plug-in connector—being configured flat or convex at their end facing away from the optical waveguide in order to ensure that, in a manner that is as loss-free and insensitive to scattered light as possible, light is coupled on the front from one ferrule into the other ferrule that is arranged opposite from the other plug or the other socket, said arrangement being rotated by 180° with respect to the first ferrule. Here, the ferrules serve to protect the ends of the optical waveguides against wear and tear as well as against damage and, in the area of the plug-in connector, they ensure a simpler and especially more precise guidance of the optical waveguides. Consequently, a very precise arrangement of the ferrules in such a plug-in connector is required for a reliable data transmission.

In order to improve the interchangeability of the connection cables, in most application cases, the optical waveguide cables, comprising several individual optical waveguide conductors, which are each surrounded by their own coating in the cable sheathing similar to a multi-conductor stranded wire, are exclusively made with plugs whereas, for example, device connections or wall connections are made with receptacles, whereby, in order to create an optical connection between two optical waveguide cables, for example, when an extension is needed, each of the front ends of the optical waveguides, which are provided with a plug and which are to be connected front to front from opposite sides, are inserted into a double coupler for optical plugs.

Such a plug normally consists of a housing into which an optical waveguide cable enters at the rear and of a ferrule that is connected to an optical waveguide and that projects out of the plug on the front that is opposite from the back. In this case, the ferrule is unprotected and can easily be damaged if handled carelessly.

A known plug for a plug-in connector for optical waveguides consists, for example, of a cuboidal housing that is open in the direction of the front end of the optical waveguide and that is arranged at a distance concentrically radially around the front end of an optical waveguide or around a ferrule arranged on the front end of the optical waveguide, said housing having a catch for coupling tabs arranged on the counterpart to the plug. The counterpart to the above-described plug, for example, a double coupler or a receptacle, has an inner receiving housing with a receiving opening for the optical waveguide or for the ferrule, at least two coupling tabs arranged opposite from each other and parallel to the receiving housing, separated by a gap whose width matches the thickness of the coupling housing on the plug side, as well as a protective housing that receives the coupling tabs and the receiving housing. When the plug is inserted into the double coupler or socket, the front end of the optical waveguide or the ferrule is pushed through the receiving opening into the receiving housing, whereby the receiving housing is pushed into the gap between the optical waveguide or the ferrule and the coupling housing, and the coupling housing is surrounded on at least two sides by the coupling tabs that are latched into the catch. The entire plug-in connector is surrounded and protected by the protective housing, which can also be made of metal.

German patent application DE 199 30 062 A1 describes a plug for optical waveguides, having a plug housing onto whose lengthwise narrow sides unlocking levers are longitudinally affixed that actuate springy latching noses that, in the plugged state, latch into a coupler counterpart in locking openings of said coupler counterpart and, through pressure on the unlocking lever in the area of actuation zones, they unlatch from the locking openings, whereby the plug housing has recesses in the area of the unlocking levers so that the unlocking levers can be moved into said recesses in order to pull out the plug. A locking attachment can be placed onto the back part of the plug and the housing wall and the cover part of this locking attachment cover the unlocking levers and said locking attachment has locking elements that lock said locking attachment against being manually pulled off of the plug housing, whereby the locking elements can be unlocked by means of a tool that can be placed onto the locking attachment and that has unlocking elements. Moreover, the locking attachment has a hood that extends over the locking openings of the coupler counter-part. The drawback of this plug-in connector is that, in addition to its complicated structure, it requires special tools to release the connection.

European patent application EP 0 599 784 B1 describes a plug-in connector with which locking means are concealed in a double coupler, said locking means each being actuated by means of a rocker arranged on the plug that can be inserted on either side into the double coupler for purposes of unlocking. A drawback of this plug-in connector is the fact that, irrespective of the complex internal structure of the plug-in connector, a rotatably mounted rocker has to be arranged on each plug, thus resulting in more assembly work, leading to production costs that are unacceptably high for a mass-produced item such as plugs.

World patent WO 00/37979 describes a plug for an optical waveguide with a plug housing at one of whose ends a fiber optic cable is inserted, and at whose opposite end ferrules exit which are each encapsulated in a first individual ferrule housing which, on its outside, has locking means, each of which interact with a locking counter-element of a plug counter-coupler.

The inner individual ferrule housings are each held in an outer individual ferrule housing and are movable relative thereto in the axial direction, said outer individual ferrule housing being accommodated in the plug housing such that it is movement-coupled and it has means with which the lock between the inner individual ferrule housing and the locking counter-element of the plug counter-coupler can be released by axially moving the outer individual ferrule housing against the inner individual ferrule housing in the direction of the cable insertion end. Between the fiber optic cable and the inner individual ferrule housing, there is a movement-coupled connection that can be an additional housing. A drawback of this plug-in connector is the likewise very complex mechanism that is meant to ensure the locking and unlocking of the plug-in connector.

German utility model DE 298 13 475 U1 describes another plug-in connector for which likewise a tool is needed in order to release the connection.

The large number of plugs and couplers known for optical plug-in connectors makes it clear that it has not been possible so far to develop a satisfactory standard for this important realm of modern data transmission technology. Moreover, the optical waveguide plug-in connectors, which are usually developed independently by each manufacturer, do not permit the use of components or even just cables made by different manufacturers.

TECHNICAL OBJECTIVE OF THE INVENTION

Therefore, the invention is based on the objective of developing a plug and a mating coupler, especially a double coupler, that first of all, has the most prevalent, compact and simple form possible, that has a proven reliable, easily lockable and unlockable plug-in connector, and moreover that is structured as simply as possible.

DISCLOSURE OF THE INVENTION AND ITS ADVANTAGES

In order to achieve this objective, the plug for creating an optical waveguide plug-in connector of the type described in claim 1 is characterized according to the invention by a housing that, together with the locking device, has the outer form of an RJ-45 plug and that is at least partially open at its front and at its back, said housing having a protected interior surrounded by the narrow sides running parallel to the longitudinal axis of the plug-in connector, and having at least one catch spring arranged on the outside of the housing on at least one narrow side running parallel to the longitudinal axis of the plug-in connector as the locking device, said housing having a ferrule holder arranged in the interior for each optical waveguide that passes through the back of the housing into the interior, whereby the ferrule holder, on its side facing the front of the housing, has a recess for each coupling ferrule arranged in a coupler that matches the plug and a bore that receives the optical waveguide and that runs parallel to the longitudinal axis of the plug-in connector from its side facing the back of the housing through the center of the recess, through which bore the optical waveguide can be passed to the recess that serves to receive the coupling ferrule, whereby the optical waveguide is inserted into the bore with or without sheathing and inserted through the bore into the ferrule holder until the front end of the optical waveguide is flush with the bottom of the recess and can be connected to the ferrule holder, for example, by gluing or encapsulating, and the opening on the front of the housing serves to pass the at least one coupling ferrule—in each case, one for each optical waveguide that is to be connected to the plug-in connector—through to the ferrule holder. Here, the ferrule holder, especially for the sake of simpler processing, is made of plastic.

RJ-45 plugs are known, for example, as plugs of telephone cables for ISDN telephone systems and especially as plugs of network cables in computer technology, and they offer the advantage of being widely used and being well-known as well as highly reliable in establishing a detachable cable connection, especially for data transmission. Due to the familiar format of an RJ-45 plug or a mating socket, which are already installed in most devices that are used for data transmission or data processing, the space requirement that manufacturers need for an optical waveguide plug-in connector that is to be integrated into such a device is known or can at least be estimated, as a result of which the development risk for the integration of an optical connection is greatly diminished.

An advantageous embodiment of the invention provides that the ferrule holder is arranged in the interior axially in the direction of the longitudinal axis of the plug so as to be spring-loaded and movable by means of a compression spring, and the spring load pushes the ferrule holder in the direction of the front of the housing. Due to the compression spring, when the ferrule holder is in the rest position, it can be arranged so as to lie somewhat further in the direction of the front than would be necessary in the case of a plug inserted into a coupler, so that when the plug is inserted into a coupler, the coupling ferrule that is arranged in the coupler and projects into the housing pushes the ferrule holder against the spring force somewhat into the plug, in order to ensure the shortest possible free transmission distance between the coupling ferrules arranged facing each other and the optical waveguide that opens up from the back through the bore flush with the bottom of the recess arranged in the ferrule holder for the coupling ferrule.

In an advantageous embodiment of the invention, a stop that limits the axial movement in the direction of the front is arranged on the ferrule holder, whereby the housing has an indentation in its interior on its side facing the front, and the indentation, together with the stop arranged on the ferrule holder, limits the axial mobility of the ferrule holder.

An advantageous embodiment of the invention provides that a tab that protrudes from the plug-in connector when a plug is inserted into a socket or into a coupler is arranged on the free end of the catch spring, said tab being used to actuate, especially to release, the catch spring.

In an advantageous embodiment of the invention, the housing and the catch spring as well as optionally the tab are configured as one piece.

In another advantageous embodiment, the diameter of the bore running in the ferrule holder parallel to the longitudinal axis of the plug-in connector is graduated at least once in the longitudinal axis of the plug-in connector for receiving the optical waveguide cable. The partially unsheathed optical fiber is inserted and glued into the graduated bore. An optical fiber normally has a coating made of plastic as a protective sheathing which is partially removed from the front end that is inserted into the ferrule holder that is situated in the plug. The exposed front part of the fiber of the optical waveguide is inserted into the thinnest front part of the bore that follows the recess for receiving the ferrule, followed by the middle part of the bore in which the fiber with the protective sheathing is normally inserted, and then comes the third part of the bore with the largest diameter, which is encapsulated with a curing adhesive around the optical fiber. Welding of the ferrule holder and the optical waveguide directly during the production is also conceivable. However, the optical waveguide can also have two different protective coatings made of plastic, in which case the fiber is stepped twice and is glued into the bore. For example, the diameter of the bore in its area facing the back of the housing can be dimensioned in such a way that a sheathing directly surrounding the optical waveguide, such as, for example, the insulation of an individual strand in a multi-strand cable, can be clamped in the bore between the ferrule holder and the optical waveguide, so that the sheathing can be connected to the ferrule holder, for instance, in order to relieve the strain of the optical waveguide between the ferrule holder and the strain relief means that is arranged on the housing and that acts on the sheathing of the optical waveguide cable comprising several individual optical waveguides.

In another advantageous embodiment of the invention, the optical waveguide cable has two optical waveguides and, in the plug, two ferrule holders for receiving two coupling ferrules are arranged in parallel next to each other, one for each optical waveguide.

In another advantageous embodiment of the invention, the ferrule holder and a spring that exerts a spring load onto the ferrule holder are arranged in an inner housing that is arranged in the housing, that has an opening for passing the coupling ferrule through in the direction of the front of the housing, and that has an opening for passing the optical waveguide through in the direction of the back of the housing, whereby the inner housing is pushed from the back of the housing into the housing that has an indentation at least on the narrow side in the area facing the back, and said indentation is elastically pressed apart when the inner housing is inserted and then, when the inner housing strikes, for instance, a stop edge arranged on the housing so that the inner housing comes to lie in its target position in the housing, the indentation rebounds behind the inner housing so that the inner housing is affixed in the housing. Other conceivable ways to insert the inner housing into the housing are, for example, to select a dual-shell design for the housing or else to insert the inner housing through a gap that starts on the front, whereby this is done on one of the narrow sides, preferably, the lower narrow side that lies opposite from the catch spring. Each ferrule holder, along with its associated spring, is provided with its own inner housing and is arranged in the housing.

In another advantageous embodiment of the invention, all of the ferrule holders and their associated springs arranged in the plug, are arranged in a shared inner housing that surrounds the interior and that is arranged in the housing, whereby the side of the shared inner housing facing the front and the back has a sufficient number of openings for passing the coupling ferrules and the optical waveguides through, whereby when the plug-in connector is put together, a coupling ferrule has to be able to project into the housing for each ferrule holder.

In another advantageous embodiment of the invention, the inner housing has a dual-shell design for purposes of simplifying the assembly of the ferrule holders and the optical waveguides.

In another advantageous embodiment of the invention, the inner housing has an indentation on its inside facing the ferrule holder on the side facing the front and this indentation, together with the stop arranged on the ferrule holder, limits the axial mobility of the ferrule holder in the direction of the front. An equivalent solution is a groove that is limited in the direction of the front and that has a rectangular cross section into which a nose arranged on the ferrule holder engages so that, as a path limitation, the nose strikes the limitation of the groove.

An especially advantageous embodiment of the invention is characterized by a strain relief means that is arranged in the inner housing and that acts on the sheathing of the optical waveguide cable. The strain relief means can comprise, for example, an anchor that is connected directly to the sheathing of the optical waveguide cable and especially formed so as to be essentially T-shaped or else it is a recess that accommodates the T-shaped anchor in the lower and/or upper shell of the inner housing.

In an advantageous embodiment of the invention, the catch spring is arranged running parallel to the appertaining narrow side and preferably, the end of the catch spring facing the front of the housing and running parallel to the front is resiliently connected to the housing, so that the catch spring can be pushed down resiliently perpendicular to the narrow side, for example, in order to detach the plug-in connector.

An especially advantageous embodiment of the invention is characterized by a modified RJ-45 plug with a catch spring arranged on the outside of the plug and with a tab arranged as a housing on the catch spring, whereby the modification lies in the fact that the RJ45 plug housing has an inner housing containing a ferrule holder for receiving a coupling ferrule which, when the plug-in connector consisting of the plug and the coupler is put together, extends from the front and projects into the RJ45 plug for each optical waveguide passing through the back of the housing into the inner housing. Due to the RJ45 geometry for the housing, additionally needed components can be produced very easily by modifying components that are compatible with the RJ-45 geometry, for example, double couplers, for connecting and extending two optical waveguide cables, in that an insert that is compatible with the modified optical plug and with the transmission distance between the plugs that are opposite from each other in the double coupler is inserted into the appertaining, largely unchanged housing.

Another especially advantageous embodiment of the invention is characterized by a plug ferrule arranged in the bore of the ferrule holder and connected to the optical waveguide.

A double coupler for a plug for creating an optical waveguide plug-in connector of the type set forth in claim 16 is characterized according to the invention in that the coupling housing is a modified coupling housing of an RJ-45 double coupler, whereby the modification lies in the fact that a coupling insert is arranged in the coupling housing having a catch for the locking device and, as seen from the plug, this coupling insert forms the back wall of the socket that serves to receive the plug and it limits the path of a plug inserted into the socket in the direction of the longitudinal axis of the plug-in connector, whereby at least one cylindrical passage opening is arranged in the coupling insert, namely, one for each optical waveguide arranged in a modified RJ-45 plug; a hollow-cylindrical ceramic sleeve is arranged inside the cylindrical passage opening and on each side, a coupling ferrule is arranged in the ceramic sleeve, and the ceramic sleeve and the coupling ferrule abut in the middle of the socket, whereby the ceramic sleeve has an inner diameter that matches the outer diameter of the individual coupling ferrule. Through the arrangement of the ferrules in the coupler, as coupling ferrules, they are protected against dirt and damage inside the coupler, in contrast to an arrangement on the plug from which they would otherwise have to project. However, if the coupler or socket is a receptacle or a single coupler, then only one coupling ferrule is arranged inside the hollow-cylindrical ceramic sleeve.

In an advantageous embodiment of the double coupler according to the invention, the coupling insert is split perpendicular to the longitudinal axis of the plug-in connector, whereby each half of the coupling insert is pressed into one half of the coupling housing that is split on the same plane.

In another advantageous embodiment of the double coupler according to the invention, the coupling ferrule is split perpendicular to the longitudinal axis of the plug-in connector.

A single coupler—designated as a receptacle—for detachably connecting a plug to an optical waveguide cable situated opposite according to claim 19 is characterized according to the invention in that the receptacle housing is a modified socket housing of an RJ-45 socket, whereby the modification lies in the fact that a coupling insert is arranged in the socket housing having a catch for the locking device, and said coupling insert comprising at least one cylindrical passage opening arranged in the coupling insert as well as a hollow-cylindrical ceramic sleeve arranged in the passage opening, said hollow-cylindrical ceramic sleeve having an inner diameter that matches the outer diameter of a coupling ferrule, and also comprising a coupling ferrule that is arranged in the ceramic sleeve and that is secured against moving in the direction of the longitudinal axis of the plug-in connector, whereby an optical waveguide is arranged in the coupling ferrule in the direction of the plug on the front, lying flush with the coupling ferrule, and said optical waveguide comes out of the coupling ferrule on the side facing away from the plug. Here, too, the arrangement of the ferrule in the coupler—coupling ferrule—results in a reliable protection against dirt and damage, in contrast to an arrangement on the plug from which it would otherwise have to project.

In an advantageous embodiment of the single coupler or receptacle according to the invention, the coupler insert is split perpendicular to the longitudinal axis of the plug-in connector.

BRIEF DESCRIPTION OF THE DRAWINGS, SHOWING

Figure 2:
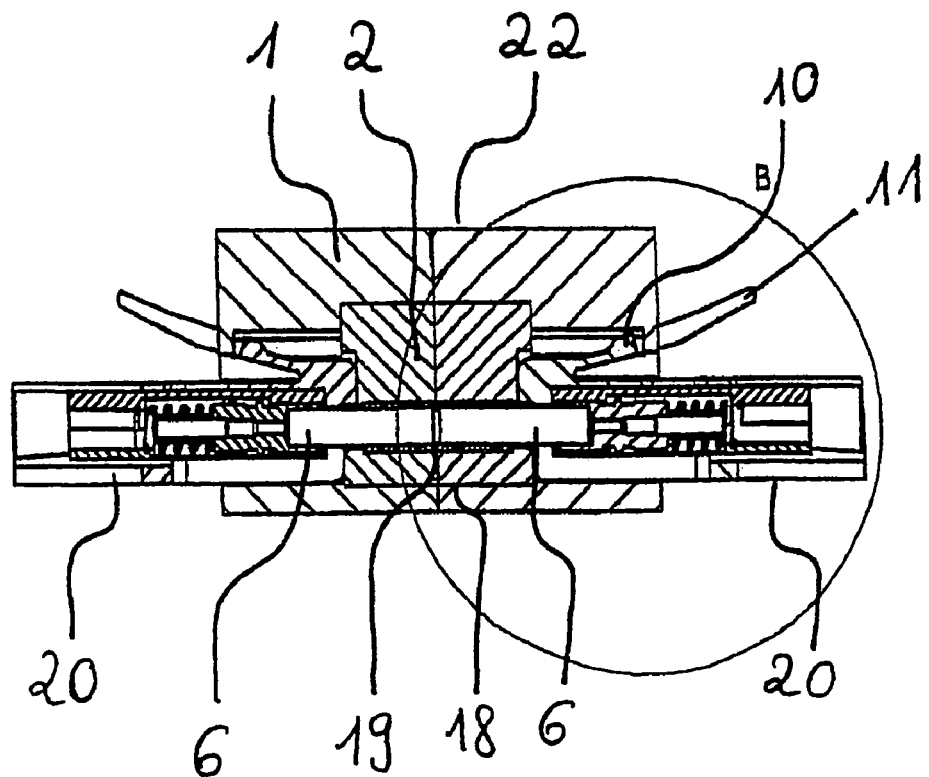
Figure 3:
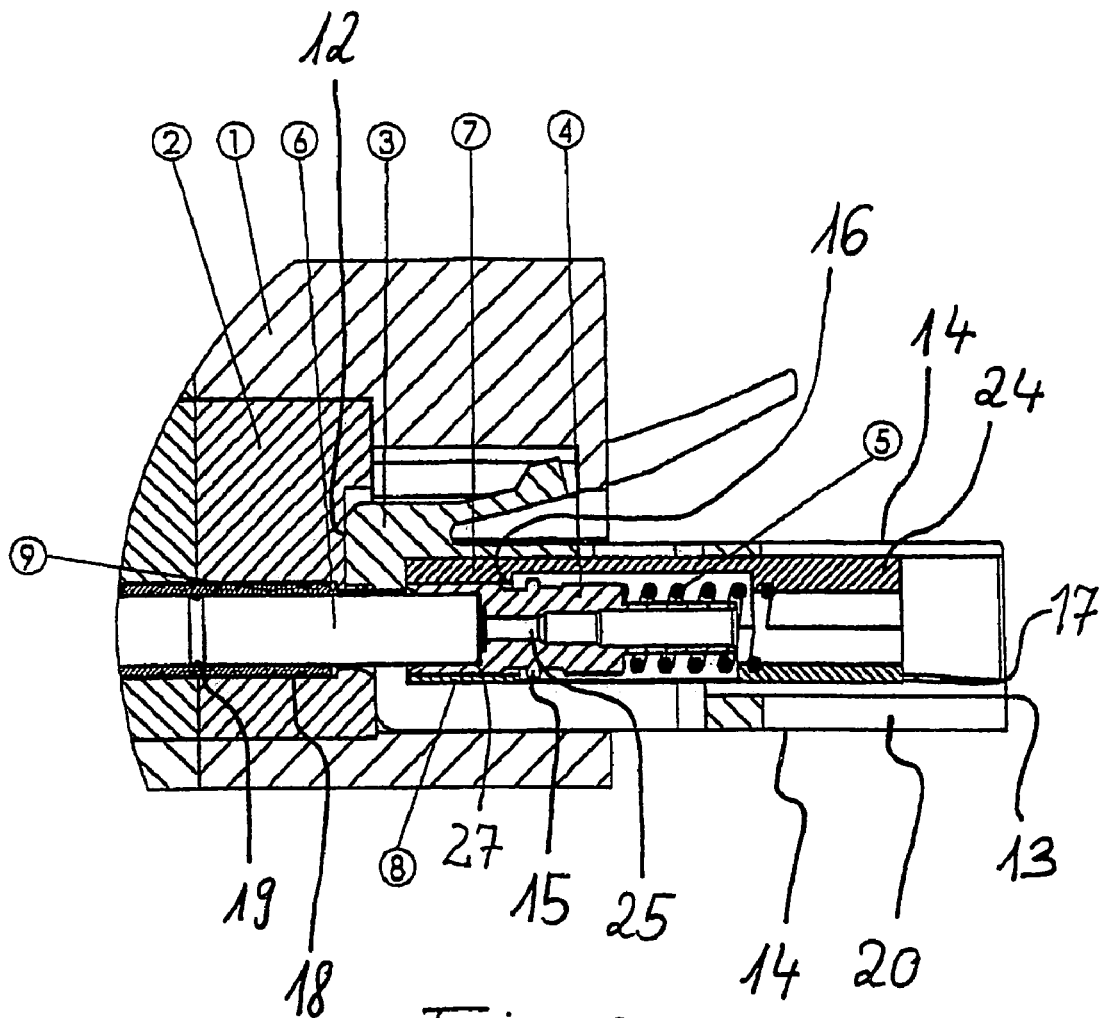
Figure 5:
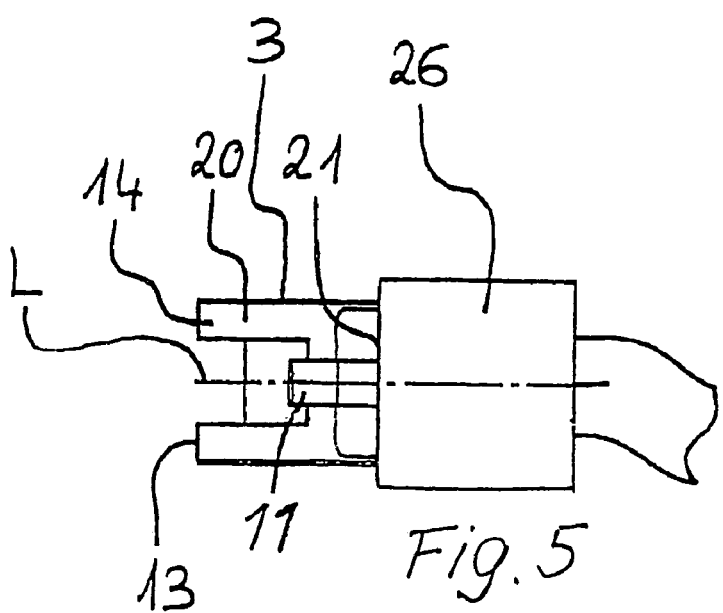
Figure 4:
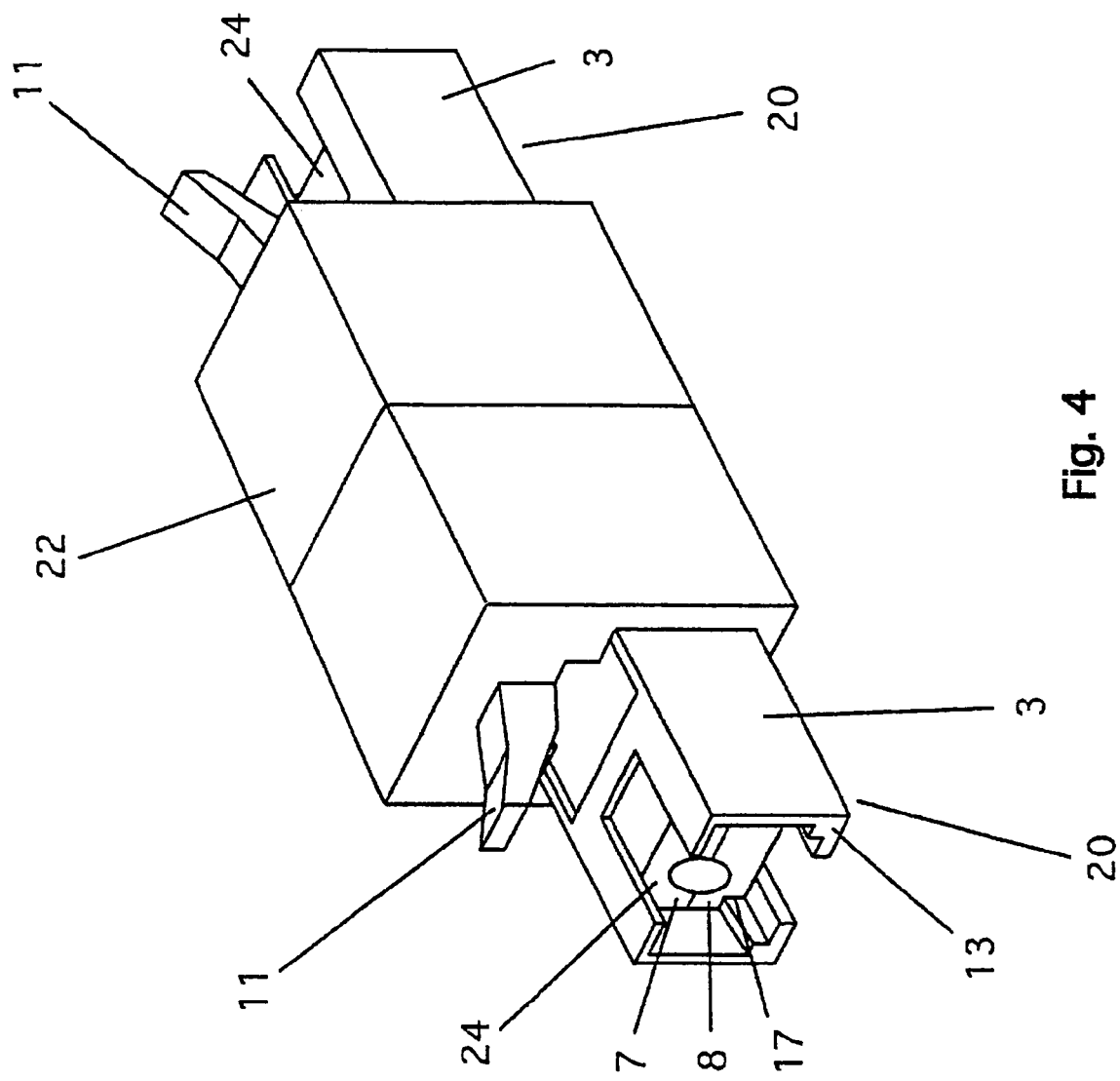

FIG. 1 a top view of a plug-in connector consisting of two RJ-45 plugs according to the invention for optical waveguides, whereby the RJ-45 plugs are inserted into a double coupler according to the invention, FIG. 2 a cross section of the plug-in connector from FIG. 1 along the sectional line A-A;

FIG. 3 a detailed view of Section B of the plug-in connector from FIG. 2,

FIG. 4 a perspective view of a plug-in connector consisting of two RJ-45 plugs according to the invention for optical waveguides, whereby the RJ-45 plugs are inserted into a double coupler according to the invention, as well as FIG. 5 a top view of a plug-in connector consisting of an RJ-45 plug according to the invention for optical waveguides, whereby the RJ-45 plug is inserted into a receptacle according to the invention.

WAYS TO EXECUTE THE INVENTION

A plug-in connector shown in FIG. 1 for detachably connecting two optical waveguide cables consists of two plugs 20, which have been inserted into a double coupler 22 from diametrically opposite sides (180°). For this purpose, each of the sides of the double coupler 22 running orthogonally to the longitudinal axis of the plug-in connector L has a socket 21 for an RJ-45 plug modified for optical waveguide transmission. On the narrow sides 14 of the RJ-45 plug housing 3 modified as an optical waveguide plug and running parallel to the longitudinal axis of the plug-in connector L, the plugs each have a catch spring 10 arranged resiliently parallel to each shell side 14, and a tab 11 is arranged on the free side of the catch spring 10 facing the back 13 of the RJ-45 plug housing 3, and said tab 11 projects out of the coupling housing 1 when the plug 20 is inserted into the double coupler 22. In order to detach the plug 20 from the double coupler 22, the catch spring 10 can be pushed down with the tab 11.

In particular, FIG. 2 shows that, with plugs 20 arranged in the double coupler 22, the coupling ferrules 6, 6' that are needed for coupling in the light and transmitting the light are arranged in the modified coupling housing 1 of an RJ-45 double coupler on the front, opposite by 180° from the optical waveguides that are fed through the bores 25. In order to ensure an exact positioning of the coupling ferrules 6, 6', a coupling insert 2 being arranged in the coupling housing 1, said coupling insert 2 having a passage opening 18 for each coupling ferrule 6, 6', a hollow-cylindrical ceramic sleeve 9 is arranged in each passage opening 18, a coupling ferrule 6, 6' is pushed into the ceramic sleeve 9 on the left and on the right in each case, and these coupling ferrules 6, 6' abut each other with their front surfaces 19. As a result of the ceramic sleeve 9, in conjunction with the coupling ferrules 6, 6' that are inserted into it, undesired material connections or movements of the overlapping light spots are ruled out over a wide temperature range, and moreover, mechanical friction on the material surfaces that slide directly on each other is virtually ruled out in the critical area of the transmission distance between the fronts of the coupling ferrules 6, 6' and the optical waveguides. When the plug 20 is pulled out, the coupling ferrules 6, 6' do not extend beyond the socket 21 so that they are effectively protected against dirt and damage. In FIG. 2, as well as in FIG. 3, among other things, it can also be seen how the catch springs 10 latch in a catch 23 arranged on the coupling housing 1.

FIG. 3 shows the structure of a plug 20 that consists of a modified RJ-45 plug housing 3 that is modified through the installation of an inner housing 24 consisting of an inner housing lower shell 7 and an inner housing upper shell 8, whereby a ferrule holder 4 is arranged in the inner housing 24 in the longitudinal axis of the plug-in connector L and this ferrule holder 4 is spring-loaded parallel to the longitudinal axis of the plug-in connector L by a spring 5 in the direction of the front 12 of the housing 3. On the end of the ferrule holder 4 facing the front 12, it has a recess for receiving a coupling ferrule 6 arranged in a coupler that matches the plug and, on its side facing the back 13 of the housing 3, the ferrule holder 4 has a receptacle in the form of a bore 25 for an optical waveguide (not shown here). The bore 25 runs parallel to the longitudinal axis of the plug-in connector L from the back 13 through the ferrule holder 4 to the recess for receiving the coupling ferrules 6, 6', whereby the bore 25 is stepped three times in the lengthwise direction of the plug-in connector so that the optical waveguide, with its sheathing, can be pushed from the back 13 into the ferrule holder 4 and the optical waveguide without the sheathing can be passed through the bore 25 until it ends up flush with the bottom of the recess for the coupling ferrules 6, 6', whereby the optical waveguide can be firmly connected to the ferrule holder 4, for example, by means of gluing. A stop 15 is arranged on the ferrule holder 4 and this stop 15 limits the axial mobility of the ferrule holder 4 by the spring 5 in the direction of the front 12 in that it strikes an indentation 16 shaped on the inner housing 24. In the resting position, the ferrule holder 4 is arranged horizontally here, lying somewhat further in the direction of the front 12 than in the position shown for a plug 20 that is inserted into a coupler, so that, due to the spring load when the plug 20 is inserted into a coupler, the coupling ferrule 6, 6' that is arranged in the coupler and that projects into the modified RJ-45 plug housing 3 pushes the ferrule holder 4 somewhat into the plug 20 against the spring force in order to ensure a precise arrangement of the coupling ferrules 6, 6' and optical waveguides frontally facing each other and the shortest possible free transmission distance between the coupling ferrules 6, 6' inserted from the other side into the recess of the ferrule holder 4 and the optical waveguide that opens up flush into this recess.

In order to prevent the inner housing 24 that is arranged in the modified RJ-45 plug housing 3 from sliding out in the direction of the back 13, a stop edge 17 is formed on the RJ-45 plug housing 3 that, together with the corresponding narrow sides 14, resiliently latches behind the inner housing 24 after the insertion of the inner housing 24, which has been put together and connected to the optical waveguides. Two ferrule holders 4 are arranged parallel next to each other in a shared inner housing 24 in the RJ-45 plug housing, one ferrule holder 4 for each optical waveguide laid in a shared optical waveguide cable or in two separately installed optical waveguide cables. When the plug 20 is inserted into the double coupler 22, the coupling ferrule 6, 6', which is arranged in the hollow-cylindrical ceramic sleeve 9 and which lies across from the plug 20 that is to be inserted, slides into the front recess on the ferrule holder 4 all the way to the stop on the bottom of the recess and, when the plug 20 is pushed further into the double coupler 22, compresses the spring 5 so that, due to the spring force, the ferrule holder 4—with the optical waveguide arranged in it—lies in the desired position opposite from the front of the coupling ferrule 6, 6' arranged in the double coupler 22. The precise axial orientation of the coupling ferrules 6, 6' arranged in the double coupler 22 is effectuated by the precise arrangement in the ceramic sleeve 9 arranged in the passage opening 18, whereby said ceramic sleeve 9 can be configured as a precision part located across from the coupling ferrules 6, 6' that abut with each other inside the ceramic sleeve 9.

FIG. 4 once again illustrates how the plugs 20 are inserted into the double coupler 22. The stop edge 17 that secures the inner housing 24 can be seen on the modified RJ-45 plug housing 3, which is open at the rear and shown in the foreground. The inner housing 25 is almost completely surrounded by the narrow sides 14 of the modified RJ-45 plug housing 3, the remaining openings serving to facilitate access to the interior occupied by the inner housing 24, especially for assembly and maintenance purposes. The tabs 11 for actuating the catch springs 10 protrude on both sides from the double coupler 22 so that the plug-in connector can be released by pressing down the tabs.

FIG. 5 shows a receptacle housing 26, a simple socket, into which a plug 20 has been inserted. An optical waveguide cable that has several individual optical waveguides, each connected inside the receptacle housing 26 to one coupling ferrule, protrudes from the side of the receptacle housing 26 opposite from the plug for purposes of further connection.

INDUSTRIAL APPLICABILITY

The invention can be industrially employed especially for the production of plug-in connectors in optical waveguide technology and in data transmission technology employing optical waveguide technology.

LIST OF REFERENCE NUMERALS

1 coupling housing
2 coupling insert
3 modified RJ-45 plug housing
4 ferrule holder
5 spring
6, 6' coupling ferrules
7 inner housing—lower shell
8 inner housing—upper shell
9 ceramic sleeve
10 catch spring
11 tab
12 front
13 back
14 narrow side
15 stop
16 indentation
17 stop edge
18 passage opening
19 front surfaces
20 plug
21 socket
22 double coupler
23 catch
24 inner housing
25 bore
26 receptacle housing
27 recess
L longitudinal axis of the plug-in connector
A-A section line
B section

The invention claimed is:
1. A plug for creating an optical waveguide plug-in connector for an optical waveguide cable having at least one optical waveguide, said plug comprising a housing, a ferrule holder connected to the optical waveguide and arranged in the housing, and comprising at least one locking device arranged on the outside on a narrow side of the housing, wherein the housing together with the at least one locking device has the outer form of an RJ-45 plug and is at least partially open at its front and at its back, said housing having an interior surrounded by the narrow sides running parallel to the longitudinal axis of the plug-in connector, and having at least one catch spring arranged on the outside on at least one narrow side of the housing as the locking device, for engagement into a coupler, whereby the catch spring is resiliently connected to the housing, said housing having a ferrule holder arranged in the interior for each optical waveguide that passes through the back of the housing into the interior, whereby the ferrule holder, on its side facing the front of the housing, has a recess for each coupling ferrule and a bore that runs parallel to the longitudinal axis of the plug-in connector from its side facing the back of the housing through the center of the recess; wherein the diameter of the bore in the ferrule holder is configured so as to be graduated at least once in the direction of the lengthwise axis of the plug-in connector.

2. The plug according to claim 1, wherein the ferrule holder is arranged in the interior axially in the lengthwise direction of the plug-in connector so as to be spring-loaded and movable by means of a compression spring, and the compression spring pushes the ferrule holder in the direction of the front of the housing.

3. The plug according to claim 2, wherein a stop is arranged on the ferrule holder, and wherein the housing has an indentation on its side facing the front, and the indentation, together with the stop arranged on the ferrule holder, limits the axial mobility of the ferrule holder.

4. The plug according to claim l, wherein a tab is arranged on the free end of the catch spring.

5. The plug according to claim 1, wherein the housing and the catch spring as well as the tab are configured as one piece.

6. The plug according to claim 1, wherein the optical waveguide cable has two optical waveguides and two ferrule holders are arranged in parallel next to each other in the plug.

7. The plug according to claim 1, wherein the ferrule holder and a spring that exerts a spring load onto the ferrule holder are arranged in an inner housing that is arranged in the housing, that has an opening for passing the coupling ferrule through in the direction of the front (12) of the housing, and that has an opening for passing the optical waveguide through in the direction of the back of the housing.

8. The plug according to claim 7, wherein all of the ferrule holders and their associated springs arranged in the plug are arranged in a shared inner housing that is arranged in the housing, whereby the side of the shared inner housing facing the front (12) and the back has a sufficient number of openings for passing the coupling ferrules and the optical waveguides through.

9. The plug according to claim 7, wherein the inner housing is configured with a dual-shell design.

10. The plug according to claim 7, wherein the inner housing has an indentation on its inside facing the ferrule holder on the side facing the front and this indentation, together with a stop arranged on the ferrule holder, limits the axial mobility of the ferrule holder.

11. The plug according to claim 7, comprising a strain relief means that is arranged in the inner housing and that acts on the sheathing of the optical waveguide cable.

12. The plug according to claim 1, wherein the catch spring is arranged running parallel to the appertaining narrow side and the end of the catch spring facing the front of the housing and running parallel to the front is resiliently connected to the housing.

13. The plug according to claim 7, comprising a modified RJ-45 plug as a housing, whereby the modification lies in the fact that the housing of an RJ-45 plug has an inner housing containing a ferrule holder for receiving a coupling ferrule which extends from the front and projects into the RJ-45 plug for each optical waveguide passing through the back of the housing into the inner housing.

14. The plug according to claim 1, comprising a plug ferrule arranged in the bore of the ferrule holder and connected to the optical waveguide.

15. A double coupler to detachably connect the fronts of two plugs arranged opposite from each other, each plug comprising a housing, a ferrule holder connected to at least one optical waveguide and arranged in the housing, and comprising at least one locking device arranged on the outside on a narrow side of the housing, wherein the housing together with the at least one locking device has the outer form of an RJ-45 plug and is at least partially open at its front and at its back, said housing having an interior surrounded by the narrow sides running parallel to the longitudinal axis of a plug-in connector, and having at least one catch spring arranged on the outside on at least one narrow side of the housing as the locking device, for engagement into a coupler, whereby the catch spring is resiliently connected to the housing, said housing having a ferrule holder arranged in the interior for each optical waveguide that passes through the back of the housing into the interior, whereby the ferrule holder, on its side facing the front of the housing, has a recess for each coupling ferrule and a bore that runs parallel to the longitudinal axis of the plug-in connector from its side facing the back of the housing through the center of the recess, wherein the coupling housing is a modified coupling housing of an RJ-45 double coupler, whereby the modification lies in the fact that a coupling insert is arranged in the coupling housing having a catch for the locking device, comprising at least one cylindrical passage opening arranged in the coupling insert as well as a hollow-cylindrical ceramic sleeve arranged inside the passage opening, and a respective coupling ferrule arranged on the left and on the right in the ceramic sleeve, whereby the ceramic sleeve has an inner diameter that matches the outer diameter of the coupling ferrules whose front surfaces are opposite from each other inside the ceramic sleeve.

16. The double coupler according to claim 15, wherein the coupling insert is split perpendicular to the longitudinal axis of the plug-in connector.

17. The double coupler according to claim 15, wherein the coupling ferrule is split perpendicular to the longitudinal axis of the plug-in connector.

18. A receptacle, for detachably connecting the front of a plug to an optical waveguide cable situated opposite from it, the plug comprising a housing, a ferrule holder connected to at least one optical waveguide and arranged in the housing, and comprising at least one locking device arranged on the outside on a narrow side of the housing, wherein the housing together with the at least one locking device has the outer form of an RJ-45 plug and is at least partially open at its front and at its back, said housing having an interior surrounded by the narrow sides running parallel to the longitudinal axis of a plug-in connector, and having at least one catch spring arranged on the outside on at least one narrow side of the housing as the locking device, for engagement into a coupler, whereby the catch spring is resiliently connected to the housing, said housing having a ferrule holder arranged in the interior for each optical waveguide that passes through the back of the housing into the interior, whereby the ferrule holder. on its side facing the front of the housing, has a recess for each coupling ferrule and a bore that runs parallel to the longitudinal axis of the plug-in connector from its side facing the back of the housing through the center of the recess, wherein the receptacle housing is a modified socket housing of an RJ-45 socket, whereby the modification lies in the fact that a coupling insert is arranged in the socket housing having a catch for the locking device, and said coupling insert comprising at least one cylindrical passage opening arranged in the coupling insert, as well as a hollow-cylindrical ceramic sleeve arranged in the passage opening, said hollow-cylindrical ceramic sleeve having an inner diameter that matches the outer diameter of a coupling ferrule, and also comprising a coupling ferrule that is arranged in the ceramic sleeve and that is secured against moving in the direction of the longitudinal axis of the plug-in connector, whereby an optical waveguide is arranged in the coupling ferrule in the direction of the plug on the front, lying flush with the coupling ferrule, and said optical waveguide comes out of the coupling ferrule on the side facing away from the plug.

19. The receptacle according to claim 18, wherein the coupling insert is split perpendicular to the longitudinal axis of the plug-in connector.

* * * * *

UNITED STATES PATENT AND TRADEMARK OFFICE
CERTIFICATE OF CORRECTION

PATENT NO. : 7,488,115 B2 Page 1 of 1
APPLICATION NO. : 11/597965
DATED : February 10, 2009
INVENTOR(S) : Theis It is certified that error appears in the above-identified patent and that said Letters Patent is hereby corrected as shown below:

On the cover page, item [30] change the Claim of Priority of the Foreign Application Priority Data to correctly read as follows:

--October 28, 2003 (DE) ...................... 203 16 625--.
--November 18, 2003 (DE) ................. 203 17 751--.

In Column 12, line 38, change "p1ug" to correctly read: --plug--.

Signed and Sealed this

Seventh Day of April, 2009

JOHN DOLL
*Acting Director of the United States Patent and Trademark Office*